March 23, 1971  R. S. PAULIUKONIS  3,572,362

SELF-RECIPROCATING FOUR-WAY VALVE

Filed June 19, 1969

INVENTOR.
RICHARD S. PAULIUKONIS

United States Patent Office 3,572,362
Patented Mar. 23, 1971

3,572,362
SELF-RECIPROCATING FOUR-WAY VALVE
Richard S. Pauliukonis, 6660 Greenbriar Drive,
Cleveland, Ohio 44130
Filed June 19, 1969, Ser. No. 834,774
Int. Cl. F15b *11/08, 13/042*
U.S. Cl. 137—102                             1 Claim

ABSTRACT OF THE DISCLOSURE

A four-way valve accomplishes reciprocating action for a sequential cylinder feeding and exhaust by the working fluid supplied. The working fluid pressure exerts a force upon the surfaces of the internally moving parts of the valve, and facilitates their shift in a self-regulated fashion when force outbalance permits, and independent of external means. The moving parts within said valve proper comprise a sleeve of dual piston construction provided with seals and interconnected through an elastic link with a free floating piston, all responsive to the pressure affect of the working fluid, and instrumental in the sequential return of the moving parts to the original position, facilitating a self-reciprocating action of the four-way valve, subject to the present invention.

---

This invention relates to a four-way valve for fluid power control and more particularly to an independent action of a four-way valve in a pneumatic or hydraulic circuit which provides sequential stroke of force by means of a cylinder action upon an object of any chosen character. For example, shoe sole sewing can be considered a sequential action of a double acting cylinder provided with a needle and controlled by a four-way valve.

In general, a four-way valve necessitates the use of an operator, manual or electrical, which would define the mode, the sequence, or speed of operation. A typical electrical operator is a solenoid which either directly or indirectly, by pilot control, provides means for shifting valve sleeve or poppet and thus sequentially feeding or exhausting cylinder served, by such a four-way valve. Manual operators constitute another type of sleeve or poppet shifting means.

Operation of a four-way valve without the use of operators has not been practically accomplished as yet.

The general object of the present invention is to provide a valve design of novel concept and of extreme simplicity. More specifically, an object of the invention is to provide a four-way valve serviced and operated by the pressurized working fluid which exerts forces upon the surfaces of specially designed and mathematically balanced internally moving valve components and thus facilitates self-regulated sequence of operation.

Further it is an object of this invention to provide means through a novel valve design concept for valve operation which entails additional advantage of self-reciprocating in that its speed is strictly pressure dependent: the higher the pressure of the working fluid the faster the reciprocating action will be.

It is still a further object of this invention to provide the fluid power control industry with a valve design that is not only simple to product but is also more reliable through the reduction of valve components such as the operators that are subject to wear and subsequent failure, in particular, if such operator is of solenoid, sensitive to not only fabrication, materials, insulation and other quality control parameters, but also to applicational abuses such as power fluctuation, moisture, overheating, etc.

Other objects and advantages of this invention will be apparent from the ensuing disclosure and the appendent claims.

Figure 1:
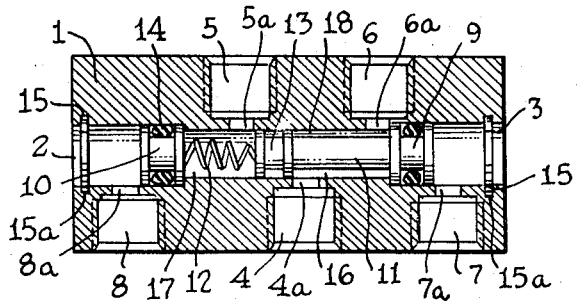
FIG. 1 is a sectional view of the valve identifying internal passages for working fluid flow, and basic valve components in detail, including the neutral-unenergized state of the valve of the present invention.

FIG. 1 illustrates the general arrangement of valve components in neutral condition and prior to being actuated by the working fluid pressure. As FIG. 1 shows, the valve body 1 of either round or rectangular configuration is provided with centrally located longitudinally oriented shouldered ports 2 and 3 which are in direct communication with a smaller size bore 18 for insertion of internal parts, and, with a number of perpendicular passages in communication with said longitudinal ports for the working fluid flow.

The internal parts constitute moving components of the subject valve and comprise an assembly of floating piston 10 interconnected through a flexible member 12 with a sleeve 11 provided with integrally machined pistons 9 of larger diameter and 13 of smaller diameter. Pistons 9, 10, and 13 are provided with seals 14 of O-ring configuration shown, but the seals can be of Quad, T or X rings, or other suitable types and of materials capable of affording adequate sealing. The flexible member 12 must be elastic, of material such as rubber compound or it simply may be an extension spring shown, which is held tightly by its ends and secured permanently to the pistons 10 and 13 for proper valve functions. Truarc rings 15 inserted into the groves 15*a* of a valve body provide the means of retaining said internal moving components and act as stops for piston 10 and sleeve 11 when their position changes in operation.

The perpendicular passages comprise the fluid inlet port 4 terminating with an orifice 4*a* leading to the annular passage 16 which longitudinally is in communication with the orifice 6*a* and the cylinder "ONE" inlet port 6. Port 5 representing cylinder "TWO" inlet enters the perpendicularly situated central valve body opening 17 via its orifice 5*a*. Opening 17 and annular space 16 comprise the continuous central bore 18 communicating and terminating with said longitudinally oriented ports 2 and 3 which are larger in size and thus join bore 18 by means of a shoulder. Opening 7 enters port 3 via orifice 7*a* and constitutes cylinder exhaust "ONE" and opening 8 enters port 2 via orifice 8*a* and constitutes cylinder exhaust "TWO."

In operation the working fluid supplied through inlet port 4 enters annulus 16 via orifice 4*a* and continues via orifice 6*a* to feed cylinder "ONE" which is connected to port 6. Gradual influx of the working fluid raises the pressure in cylinder "ONE" as well as annulus 16. This pressure acting upon the surfaces offered by the pistons constitutes end forces which when unbalanced shift internal moving parts, such as sleeve, and/or pistons. As is evident from FIG. 1, the surface area of piston 9 is larger than that of piston 13, and the force exerted over piston 9 will shift sleeve 11 to the right when its magnitude reaches or exceeds the resistance afforded by the elastic link, such as spring 12, closing off the fluid entrance into cylinder "ONE" port 6 by the newly assumed position of piston 13 in relationship to orifice 4*a*, and in turn, opening up the exhaust orifice 7a for the cylinder "ONE" exhaust via port 7 by the newly assumed position of piston 9. The shift of the position of sleeve 11 with its pistons 9 and 13, is clearly identified in FIG. 2.

Figure 2:
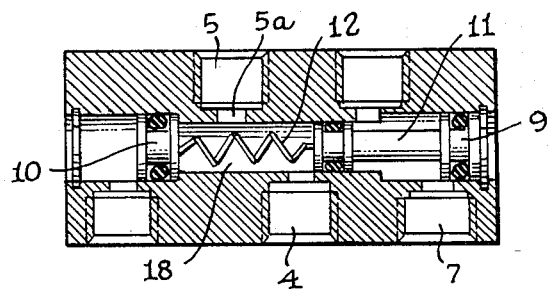
FIG. 2 is identical to the FIG. 1 above except for the location of the sleeve after energizing the valve with the working fluid.

As FIG. 2 shows, the shift of sleeve 11 also redirects the flow of the working fluid into cylinder "TWO" via orifice 5a and cylinder port 5, while cylinder "ONE" is exhausting. Again, when the force exerted over piston 10 by its working fluid feeding cylinder "TWO" via bore 18 exceeds the resistance offered by the elastic link 12 and the force of piston 9, piston 10 will shift to the left while sleeve 11 will return to its original position, as in FIG. 3.

Figure 3:
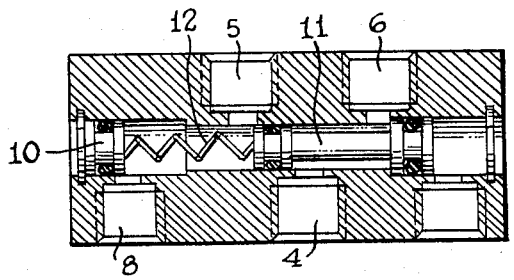
FIG. 3 shows components identical to those identified in FIGS. 1 and 2 except for the location of floating piston after sequential movement of sleeve to its original position due to the working fluid action upon the components in the four-way valve subject to the present invention.

FIG. 3 shows that the working fluid entering port 4 is again feeding cylinder "ONE" via port 6, as per FIG. 1, while cylinder "TWO" connected to port 5 is exhausting via port 8. When cylinder "TWO" empties, causing the force over piston 10 to diminish, piston 10 will return to its original position as a result of the remaining spring force, or force of other elastic member chosen for this purpose. The original position of internal parts depicted in FIG. 1, will thus be attained automatically, and the sequence of operation will restart with subsequent self-energized reciprocating action for as long as there is a supply of pressurized working fluid to port 4, satisfying the conditions set forth by the present invention.

The invention is not restricted to the slavish imitation of each and every one of the details described above which have been set forth merely by way of example with the intent of most clearly setting forth the teachings of the invention. Obviously devices may be provided which change, eliminate or add certain specific structural details without departing from the invention.

What is claimed is:

1. A four way valve comprising a valve body having a valve bore therein; an inlet port, first and second outlet ports adapted for connection to opposite ends of a double acting piston and first and second exhaust ports, all of said ports connected to said valve bore; a spool valve comprising a pair of unequal area pistons connected by a shaft reciprocable between first and second positions in said bore; limit stop means for limiting said spool valve to said two positions; said spool valve being constructed and arranged relative to said ports so that in a first position said inlet is connected to a first of said outlets while said spool blocks communication between said inlet and the second outlet and between said first outlet and a first of said exhaust ports, and fluid pressure in said first outlet acts between said pistons to urge said spool valve to a second position; said second position being such that said inlet is connected to said second outlet and blocked from said first outlet while said first outlet is connected with said first exhaust port; a free floating piston in said bore having two positions limited by stop limit means; said free floating piston in a first position blocking communication between said second outlet port and said second exhaust port and being urged by fluid pressure in said second outlet port to a second position in which said second outlet port is connected to said second exhaust port; said free floating piston and said spool being interconnected by an elastic link constructed and arranged so that the spool valve and the free floating piston are biased toward their respective first positions so that when the spool valve is in its second position a build up of fluid pressure in the second outlet port and a decrease of fluid pressure in the first outlet port will cause the free floating piston to move to its second position and through the resilient link move the spool valve from the second to the first position whereby the device continuously cycles as long the supply of fluid at the inlet continues.

References Cited
UNITED STATES PATENTS 2,298,457   10/1942   Berges _____ 91—318

ALAN COHAN, Primary Examiner

U.S. Cl. X.R.

137—624.14; 91—318